(12) United States Patent
Tuunanen et al.

(10) Patent No.: US 6,813,345 B1
(45) Date of Patent: Nov. 2, 2004

(54) SPECIAL SITUATION IN INTELLIGENT NETWORK DURING WHICH SERVICE PROVISIONING FAILS BUT SWITCHING POINT OPERATES SUCCESSFULLY

(75) Inventors: Heikki Tuunanen, Espoo (FI); Aki Korhonen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/600,082

(22) PCT Filed: Jan. 4, 1999

(86) PCT No.: PCT/FI99/00002
§ 371 (c)(1),
(2), (4) Date: Aug. 2, 2000

(87) PCT Pub. No.: WO99/35860
PCT Pub. Date: Jul. 15, 1999

(51) Int. Cl.[7] ............................................. H04M 3/42
(52) U.S. Cl. ............................... 379/201.12; 379/221.12
(58) Field of Search ...................... 379/211.03, 201.01, 379/201.12, 221.12

(56) References Cited

U.S. PATENT DOCUMENTS 5,329,578 A * 7/1994 Brennan et al. ....... 379/211.03
5,533,106 A   7/1996 Blumhardt
5,592,541 A   1/1997 Fleischer, III et al.
6,363,411 B1 * 3/2002 Dugan et al. .......... 379/201.01

FOREIGN PATENT DOCUMENTS

EP   740 480       10/1996
WO   WO 98/11738   3/1998

* cited by examiner

Primary Examiner—Creighton Smith
(74) Attorney, Agent, or Firm—Pillsbury Winthrop LLP

(57) ABSTRACT

A method associated with an intelligent network service, comprising the following steps for detecting a special situation and acting in the special situation in the best possible way: defining for the service at least one special situation which is failed for the service but successful for the switching point, defining an instruction for said at least one special situation, receiving at the detection point a message indicating the existence of the call-related service for which the special situation has been defined, receiving at the switching point a first routing instruction (201) either from a caller or the control point, checking said first routing instruction (203), detecting the special situation (204) if the first routing instruction includes the special situation, and following said instruction in response to the detection of the special situation. Besides the method, the invention also relates to an intelligent network, a service control point and a switching point of an intelligent network.

16 Claims, 6 Drawing Sheets

Figure 1:
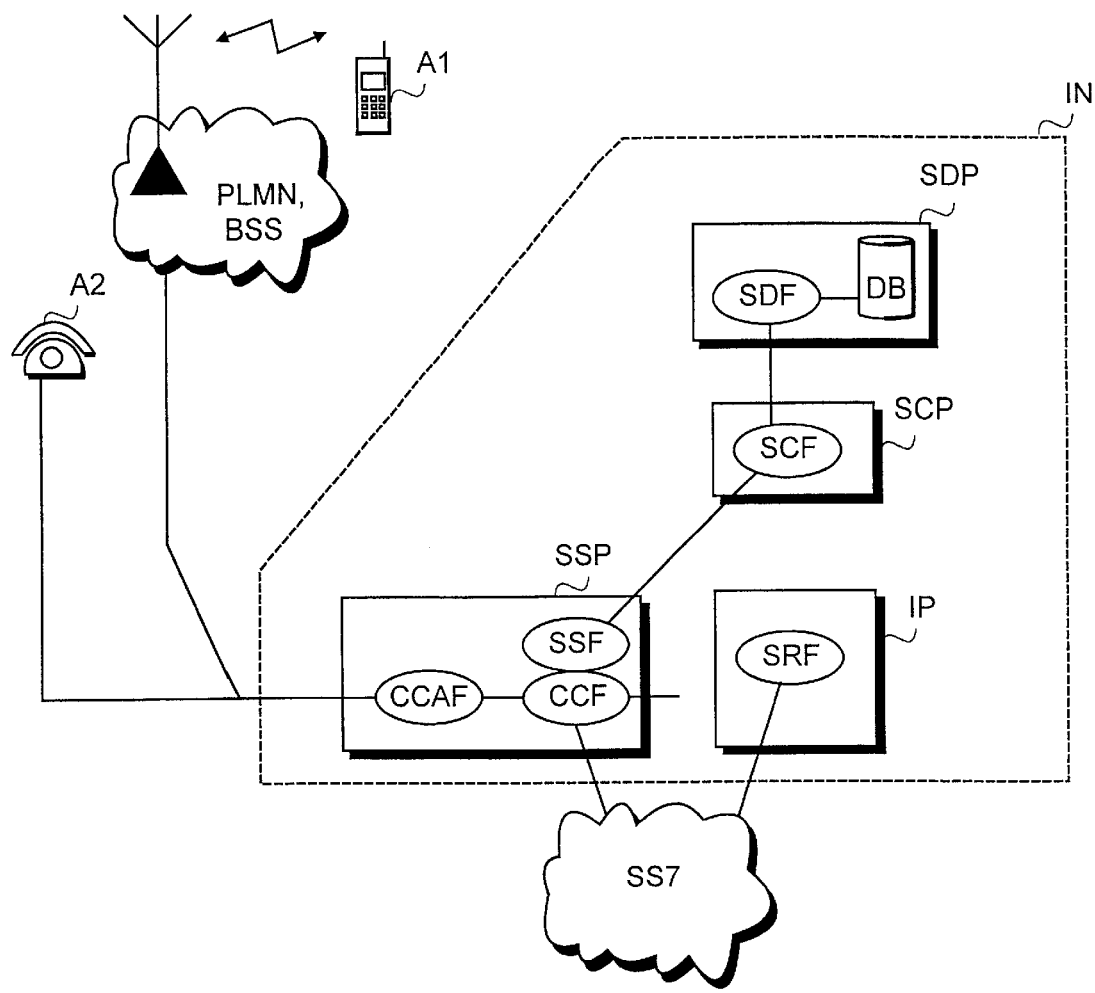

SPECIAL SITUATION IN INTELLIGENT NETWORK DURING WHICH SERVICE PROVISIONING FAILS BUT SWITCHING POINT OPERATES SUCCESSFULLY

BACKGROUND OF THE INVENTION

The invention relates to services that are produced by means of an intelligent network and more particularly to services in which a situation that is failed for the service is successful for the actual network.

An intelligent network (IN) is able to provide a subscriber of a telecommunications network, such as a wired network or a mobile telephone network, with a plurality of various services. Such services include a virtual private network (VPN) which enables the use of private numbers, and a personal number in which the intelligent network reroutes the calls directed to a personal number in a manner controlled by the subscriber. An example of such an intelligent network is described in recommendations of the International Telecommunications Union (ITU-T) Q-1200 series. In the following, the invention and its background will be described by the terminology of recommendation ETS 300 374-1 CoreINAP, but the invention can also be used in intelligent networks implemented according to other intelligent network standards. Within the scope of the present application, the concept intelligent network also refers to other application platforms which provide similar types of services.

In the intelligent network, connection arrangements are separated from service control so as to provide intelligent network services which are independent of the connection arrangements. The equipment or network element carrying out the tasks determined by a service control function or service control functions (SCF) in the intelligent network is called a service control point (SCP). Within the scope of the present application, SCF and SCP are equal, and will hereinafter be called SCP. The SCP gives call set-up instructions to the exchange, or the exchange may inquire call set-up instructions from the SCP. Exchanges responsible for an intelligent network interface are called service switching points (SSP). They contain at least a service switching function (SSF) and a call control function (CCF). The call control function CCF is not a service associated with the intelligent network, but it is a standard function in exchanges, comprising high-level call handling functions of an exchange, such as setting up and releasing transfer connections. The service switching function SSF is an interface between the call control function CCF and the service control point SCP. Within the scope of this invention, the service switching point and the functional entity formed of the CCF and SSF are equal, and will hereinafter be called SSP.

In the conventional call set-up which takes place without the help of the intelligent network, telephone exchanges make independently all deductions associated with call routing. In the intelligent network, the SCP also makes deductions associated with the routing. A basic call state model (BCSM), defined in connection with the intelligent network, describes different phases of call control and includes the points at which the call control can be interrupted in order to start an intelligent network service. When the SSP detects that a call requires an intelligent network service, it interrupts call processing and contacts the service control point which invokes a logic program associated with the service. Upon invocation of the logic program, a service logic entity or service logic entities are created for the call, and their function determines the instructions which are transmitted by the SCP to the SSP at each call phase. Service logic defines the detection points in the call and connection process at which the service logic entities can have an interactive relationship with basic call and connection control features. Call set-up or call release can be temporarily interrupted at the SSP at these detection points and further call handling instructions can be requested from the service control point SCP. The SSP interprets the instructions obtained and starts the required call control functions. If the service switching point SSP succeeds in carrying out the functions according to the instruction it received, then call setup proceeds to the next phase, and no further instructions concerning the previous phase are requested from the SCP.

It is a problem in the above arrangement that situations which are failed for a service are successful for a switching point. In these situations the switching point continues call processing without requesting additional instructions, although the situation failed for the service. An example of such a service is a call list service, the purpose of which is to reach the subscriber. However, the call may be directed to a voice mailbox, in which case the situation is successful for the switching point but failed for the call list service.

BRIEF DESCRIPTION OF THE INVENTION

An object of the invention is to solve the above problem and provide a method and equipment implementing the method so as to solve the above problem. The objects of the invention are achieved by a method which is characterized by defining for the service at least one special situation during which provisioning of the network service fails but the switching point operates successfully, defining an instruction for said at least one special situation, receiving at the detection point a message indicating the existence of the call related service for which the special situation has been defined, receiving at the switching point a first routing instruction either from a caller or the control point, checking said first routing instruction, detecting the special situation if the first routing instruction indicates the occurrence of the special situation, and following said instruction in response to the detection of the special situation.

The invention further relates to a method which is characterized by defining a special character by means of which the caller of the call that activated the service is able to indicate a special situation during-which provisioning of the call for the caller fails but the switching point operates successfully, receiving the special character at the switching point, detecting the special situation in response to the received special character, requesting a second routing instruction in response to the detection of the special situation, and transferring call control to the service control point.

The invention further relates to an intelligent network in which the methods of the invention can be applied. The intelligent network of the invention is characterized in that at least one special situation is defined for the service, it being failed for the service but successful for the switching point, an instruction has been defined for said at least one special situation, and the service switching point is arranged to detect the special situation and follow said instruction in response to the special situation.

The invention further relates to a service switching point of an intelligent network, suitable for use in the methods and intelligent network of the invention. The intelligent network service switching point of the invention is characterized in that the switching point includes memory means for storing at least one definition for a special situation and its instruction for at least one service, the special situation being failed for the service but successful for the switching point, checking means for checking if the received routing instruction leads to a special situation, and function means responsive to the checking means for carrying out the operation of the instruction.

The invention further relates to a service control point of an intelligent network, suitable for use in the methods and intelligent network of the invention. The intelligent network service control point of the invention is characterized in that for a control point service is defined at least one special situation during which provisioning of the service fails but connection set-up is successful, the control point includes reception means for receiving a situation message indicating the special situation, and management means are arranged to give new connection set-up instructions in response to the situation message.

The basic idea of the invention is to detect a service-related special situation and, as distinct from the prior art, to act in the special situation in a way that is suitable for the special situation and the service, such as inquire the caller in connection with a call list service if (s)he wishes her/his call to be connected to a voice mailbox. An advantage of this is that the service is able to influence the action that is taken in the special situation, whereby the objective of the service is achieved in the best possible way.

In a preferred embodiment of the invention, a special situation is detected not until a special character dialed by a caller is received. An advantage of this is that it also provides an opportunity to react to special situations on occasions in which the service switching point has not detected a special situation, because the voice mailbox is located in another exchange, for example, to which the switching point is connected via a telephone network, and the switching point is therefore unable to detect the special situation.

In a preferred embodiment of the invention, new instructions are requested in a special situation. An advantage of this is that the service gives further instructions by taking into account the instructions obtained from a subscriber of the service, for instance. The service may even request instructions from the caller, even though (s)he would not be the subscriber of the service. The caller is thus able to decide if (s)he wishes to leave a message in the voice mailbox or if (s)he wishes to still try to reach the called party, i.e. subscriber B, for example.

In a preferred embodiment of the invention, the service control point notifies the switching point that checking the special situation is no longer necessary. An advantage of this is that it is possible to change a service in the middle of a call to a service not having a special situation and to accept routing that leads to a special situation. For example, in the call list service routing to a voice mailbox is not accepted until all other numbers have been gone through.

In a preferred embodiment of the invention, an instruction for a special situation is defined at the service switching point. Thus, unnecessary signaling is avoided between the control point and the switching point. This is especially an advantage in special situations in which releasing the connection is more meaningful for the service than routing the call.

The preferred embodiments of the methods, intelligent network, service switching point and service control point of the invention are disclosed in the attached dependent claims.

LIST OF FIGURES

Figure 2:
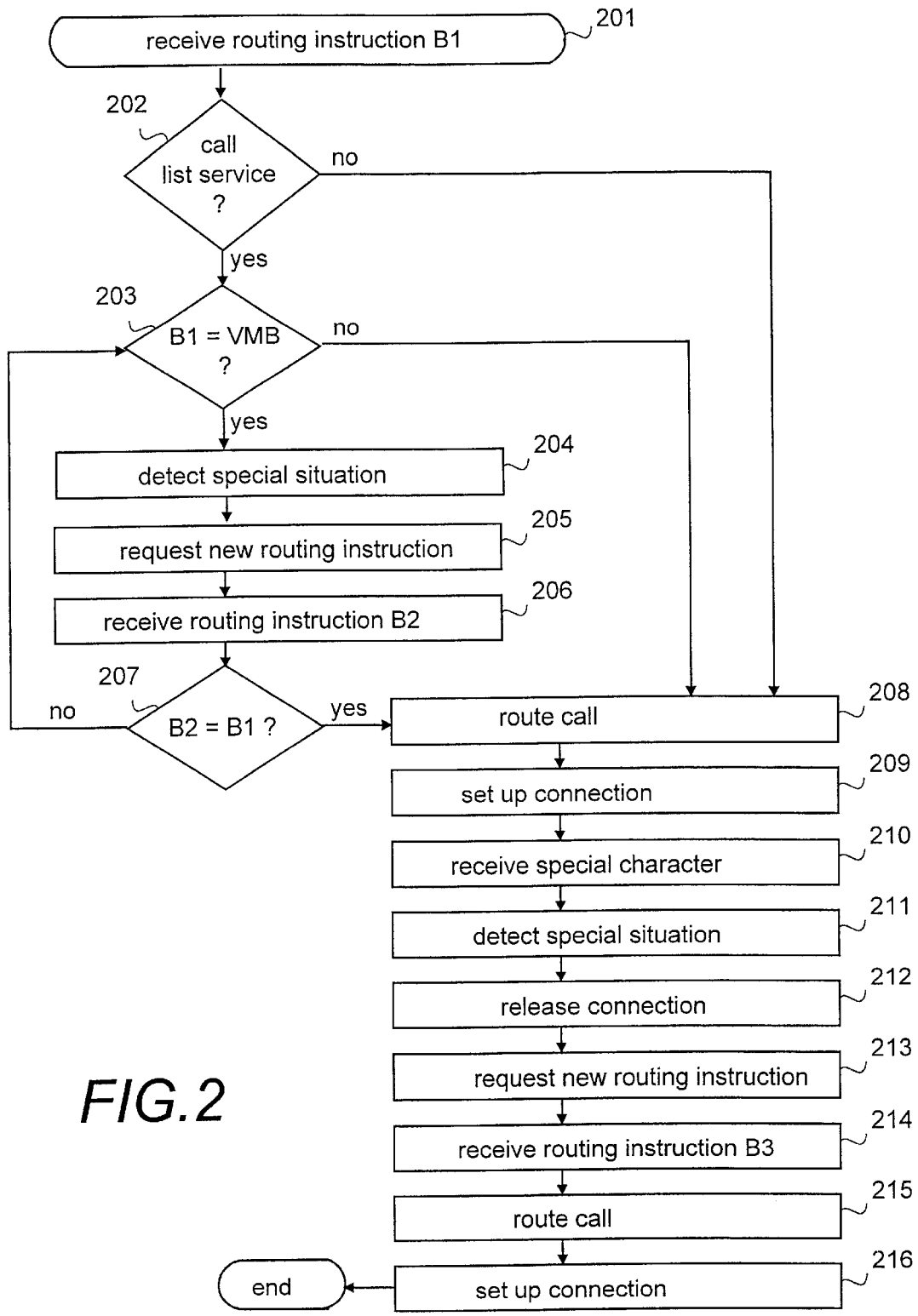
Figure 3:
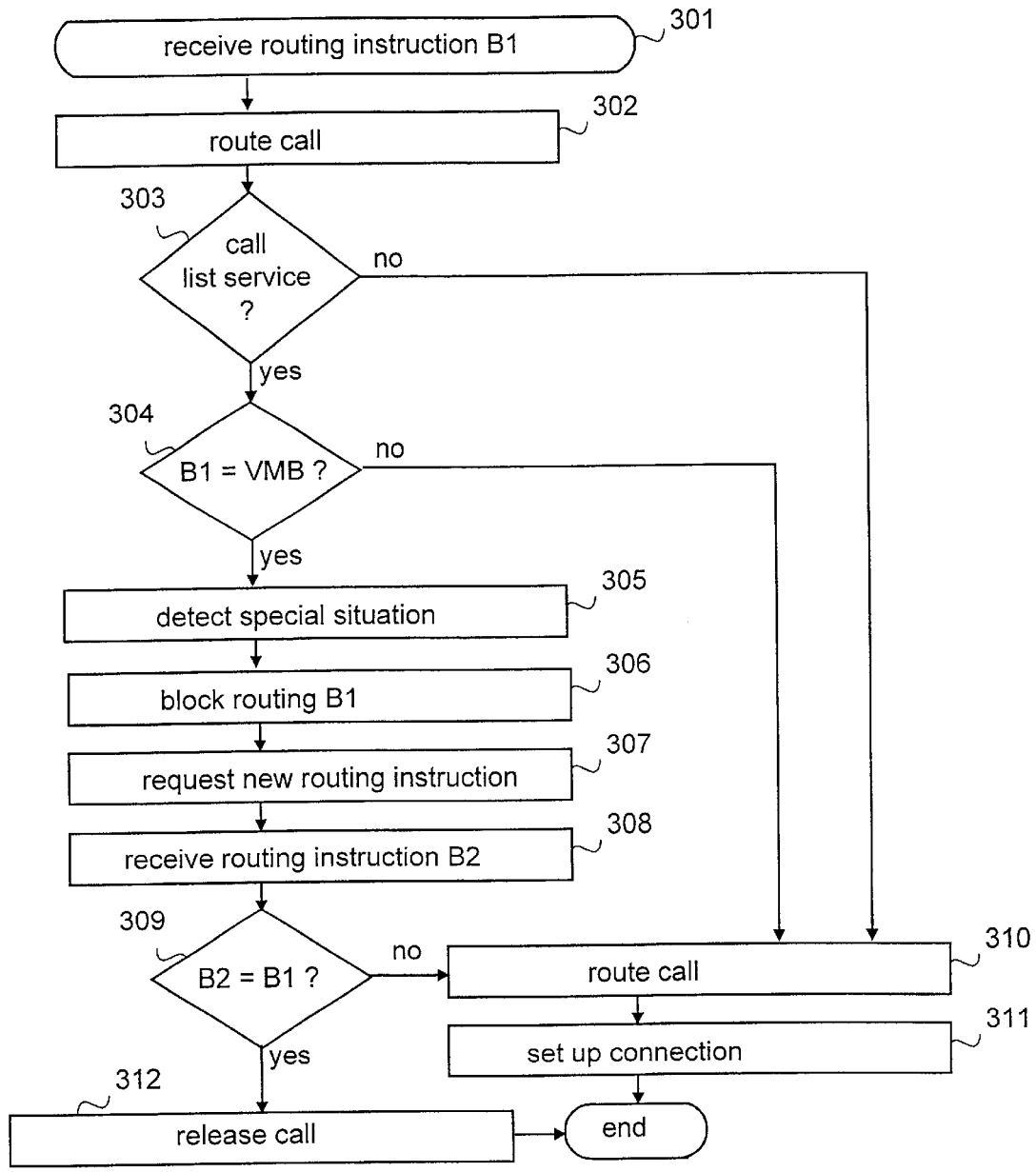
Figure 4:
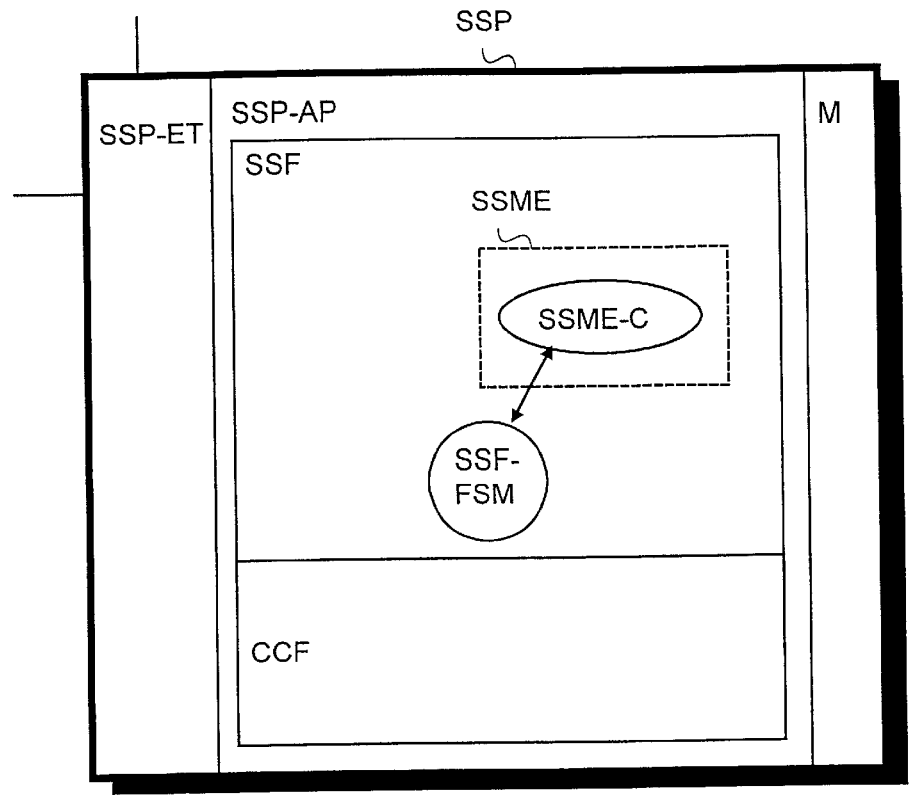
Figure 5:
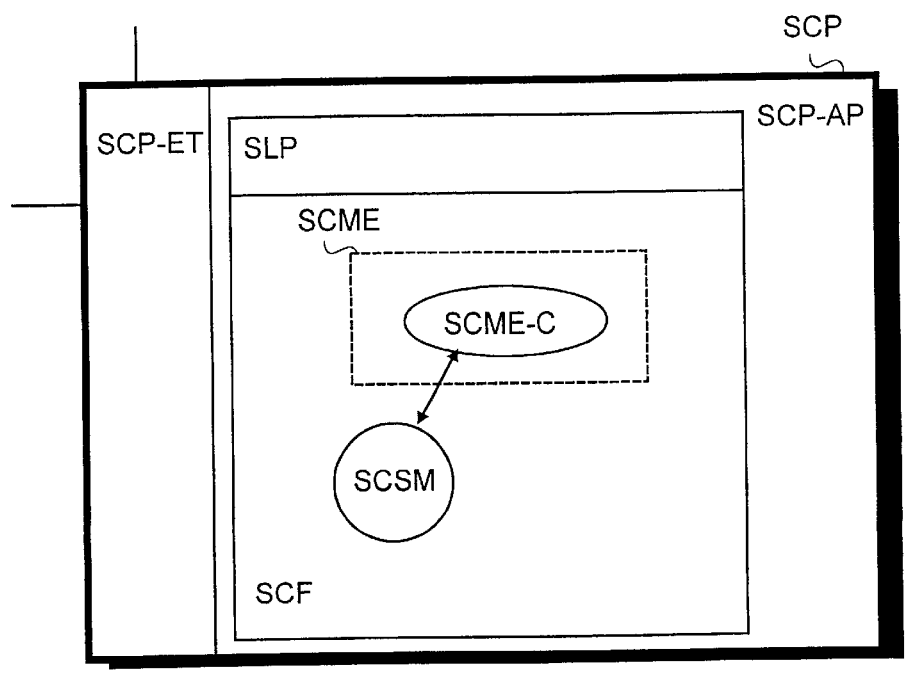
Figure 6:
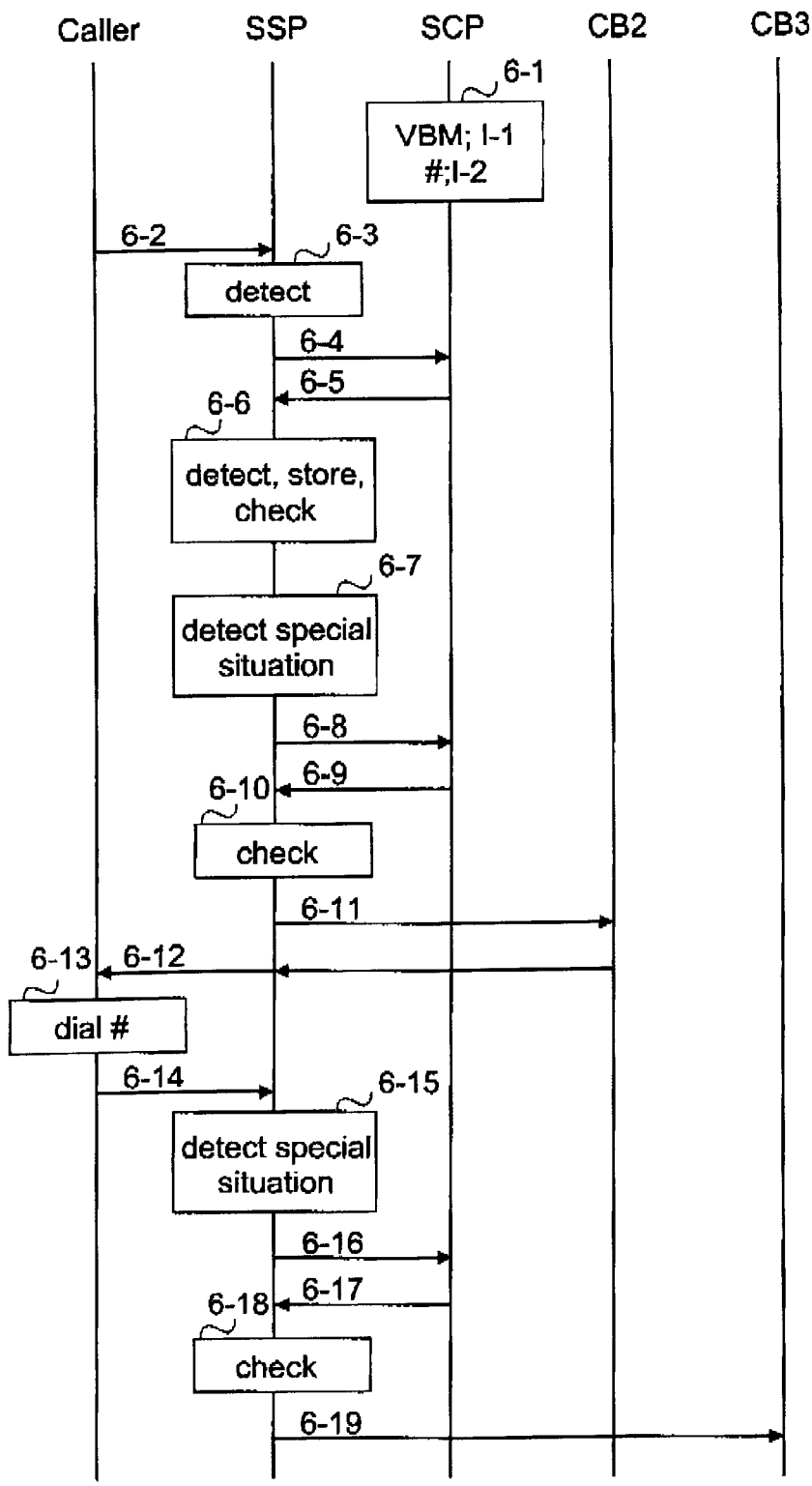
Figure 7:
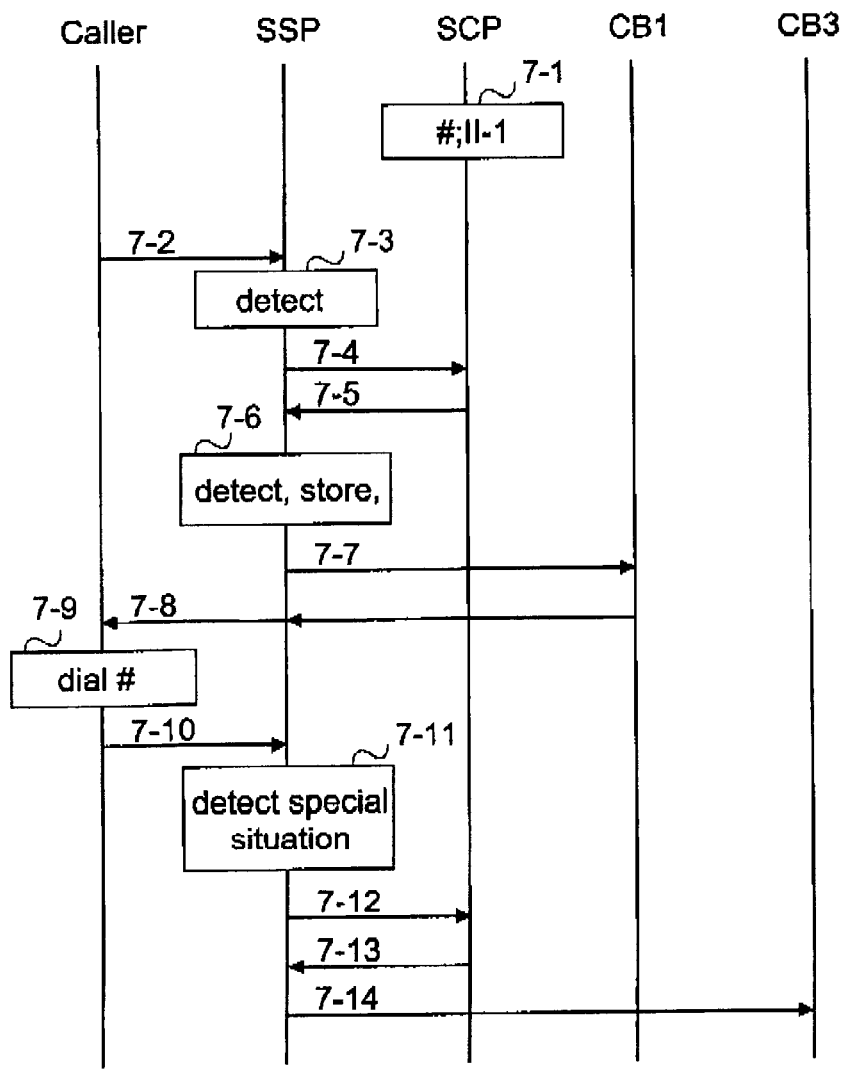

In the following, the invention will be described in more detail by means of preferred embodiments with reference to the accompanying drawings, in which FIG. 1 illustrates a telecommunication system utilizing an intelligent network, FIG. 2 shows a flow diagram of a first preferred embodiment of the invention, FIG. 3 shows a flow diagram of a second preferred embodiment of the invention, FIG. 4 illustrates an intelligent network switching point of the invention, FIG. 5 illustrates an intelligent network control point of the invention, and FIGS. 6 and 7 illustrate exemplary signalings according to the invention.

DETAILED DESCRIPTION OF THE INVENTION

FIG. 1 shows a telecommunication system utilizing an intelligent network IN. FIG. 1 shows elements and functions essential to intelligent network services. Network elements which comprise a service switching function SSF and a call control function CCF are called service switching points. The call control function CCF is not a function associated with the intelligent network, but a standard function in exchanges, comprising high-level call handling functions of an exchange, such as setting up and releasing transfer connections. The service switching function SSF is an interface between the call control function CCF and a service control function SCF. The SSF interprets requests transmitted by the SCF and forwards them to the CCF which invokes call control functions required by them. Correspondingly, the call control function CCF uses the SSF for requesting instructions from the SCF. The SSF is tightly coupled to the CCF and functions as an interface for the CCF. Consequently, each SSF is located in the same exchange together with the CCF. The service switching point of the invention is described in more detail in connection with FIG. 4. The service switching point SSP shown in FIG. 1 is a telephone exchange which includes, along with the CCF and the SSF, a call control agent function (CCAF) providing users, i.e. callers A1, A2, with access to the network. Since the SSP includes the CCAF, the SSP may be a local exchange of a fixed network or a mobile services switching centre which controls a base station subsystem BSS of a mobile telephone network PLMN, for instance. The terminal of the user may therefore be a telephone, a private branch with telephones or a mobile station communication over an air interface and including equipment supporting it.

Network elements which include the service control function SCF are called service control points SCP. The service control function is a centralized authority in the intelligent network and includes an execution environment for service logic programs, for instance. A service logic program is invoked at the service control point SCP in connection with an intelligent network service. The operation of the service logic program determines the instructions which are transmitted to the SSP by the SCP at each phase of the call in messages, or operations, between the service switching point and the service control point. The service control point of the invention is described in more detail in FIG. 5. The service control point SCP presented in FIG. 1 is a simplified version of the service control point, comprising only the service control function SCF and the necessary interfaces.

A service data function (SDF) is a database used by the SCF. The service logic programs may inquire and update SDF data. For example, subscriber-specific or service-number-specific data can be stored in the SDF. The SDF may be either a database management system at the service control point SCP or it may be a separate service data point (SDP) as shown in FIG. 1, supporting an SCF-SDF interface and including a database DB.

A specialized resource function (SRF) of an intelligent network is an interface for network mechanisms which are associated with interaction with the subscriber. The SRF may be associated with intelligent peripherals (IP) as presented in FIG. 1 and it includes more advanced speech handling functions than do the exchanges, or it may be located at the service switching point SSP.

Several service switching points SSP may be connected to one service control point SCP and, correspondingly, one service switching point SSP may be connected to several service control points SCP. For improving the reliability and dividing the load in the network, Several SCPs may contain the same service logic program and data, or a connection to the same data.

Some network nodes comprise a combined service switching point SSP and service control point SCP. Such a network node is called a service switching and control point (SSCP). It includes the functions of both the SSP and the SCP and therefore produces similar services than do the corresponding separate points together.

In the telecommunication system of FIG. 1, the network elements are connected to one another via a signaling network SS7. Other networks, such as ISDN, can also be used.

FIG. 2 shows a flow diagram of a first preferred embodiment of the invention at a service switching point SSP. In the first preferred embodiment of the invention it is assumed that instead of a call release command, a routing command is obtained from a service control point. In addition, it is assumed that connection set-up is successful, i.e. the call will be answered. A call list service is used as an example of a service. A special situation defined for it is a situation in which the call is routed to a voice mailbox (VMB) and an instruction in the special situation is defined to be to request a new routing instruction. The request for new routing instruction automatically transfers call control from the switching point to the service control point. In the call list service, a set of numbers are defined for subscriber B, i.e. for the called party, and an attempt is made to reach subscriber B by going through the numbers.

Referring to FIG. 2, the service switching point receives a routing instruction B1 from the service control point in a Connect operation in step 201. In response to receiving the routing instruction B1, the service switching point checks if the call list service is involved in step 202. The switching point may perform the checking from the information it received in the Connect operation, for example. The Connect operation also containing information on the service, in addition to the routing instruction, may include other information, such as a notification that subscriber B has a call list service. If the SSP finds out that the call list service is involved, the SSP checks, in step 203, if the number included in the routing instruction B1 is the number of the voice mailbox. The checking in step 203 is carried out by measures provided by the exchange, i.e. combination of at least the SSF and the CCF, and obvious to those skilled in the art, i.e. by analyzing, using parameter files, codes, and so on.

If the received routing instruction B1 includes the voice mailbox number, then the SSP detects a special situation in step 204, and request a new routing instruction from the SCP in step 205. The service control point gives a new routing instruction in accordance with service logic. If the service logic provides the call list service, the new routing instruction may be an instruction which the SCP requested from the caller, i.e. subscriber A, or the next number in turn in the call list. A routing instruction B2 is received at the service switching point in step 206 in response the request sent in step 205. Next, it is checked if the routing instruction B2 is the same as the routing instruction B1 in step 207. If it is detected in step 207 that the routing instruction B2 is the same as the routing instruction B1, the call is routed in step 208 and a connection is set up in step 209. Generally, if a Continue operation is received as a routing instruction in step 206, the same routing instruction has been received, and the routing proceeds in accordance with the received routing instruction in step 201.

If the routing instruction B2 is not the same as routing instruction B1, i.e. if a different number is involved, then the routine returns from step 207 back to step 203 to check if the number in the routing instruction B2 is a voice mailbox number. Generally, if a Connect operation is received as a routing instruction in step 206, then a routing instruction B2 is different than routing instruction B1.

If it is detected in step 203 that the voice mailbox number is not involved in routing instruction B2, the routine proceeds to step 208 to route the call. The routine proceeds therefrom by setting up a connection in step 209.

If in step 202 it is detected that the call list service is not involved, the routine proceeds to step 208 to route the call according to the routing instruction B1. The routine proceeds therefrom by setting up a connection in step 209.

In a first preferred embodiment of the invention, a special character is received from subscriber A at the service switching point upon connection set-up in step 210. The special character is received because the voice mailbox is located in another exchange behind the telephone network, for example, and the switching point cannot therefore recognize it. In that case, the caller, i.e. subscriber A has received an instruction in a welcoming message of the voice mailbox VMB, for example, according to which the caller can attempt to reach the called party by dialing the special character upon reception of the message, in case the caller does not want to leave a voice message. The special character is so defined that the reception of the special character leads to the detection of a special situation in step 211. Next, in step 212 the connection is released from the service switching point to the point according to the routing instruction. The connection is maintained from the service switching point to the caller, i.e. subscriber A. In other words, the connection set-up in step 209 is released. A new routing instruction is requested from the service control point in step 213. The service control point gives a new routing instruction according to service logic. If the call list service is involved, the routing instruction can be either an instruction requested from the caller, i.e. subscriber A or the next number in turn in the call list. A routing instruction B3 is received in step 214, the call is routed in step 215 and a connection is set-up in step 216. In another embodiment, the routine may proceed from step 214 to step 207 and from there onwards as described above.

The above embodiment and its alternatives can be divided into two independent embodiments, of which one or the other is used. Steps 201 to 209 can be made into an independent embodiment as well as steps 208 to 216.

In other embodiments, the checking of step 207 can be fully skipped and the routine proceeds directly from step 206 to step 208.

FIG. 3 shows a flow diagram of a second preferred embodiment of the invention at a service switching point SSP. It is also assumed therein that instead of giving a call release command, a service control point gives routing instructions, and that connection set-up is successful, i.e. the call will be answered. Similarly, a call list service which includes a special situation of routing the call to the voice mailbox VMB and the corresponding instruction is used as an example of a service.

Referring to FIG. 3, the service switching point receives a routing instruction B1 from the service control point in a Connect operation in step 301 and routes the call in step 302. Next, the service switching point checks if the call list service is involved in step 303. The switching point may be notified of the call list service in the Connect operation, for example, which also transmits information on the service, in addition to the routing instruction. If the call list service is involved, it is checked if the number in the routing instruction is a voice mailbox number in step 304. The checking is carried out in the manner described in connection with FIG. 2. If the routing instruction includes the voice mailbox number, then a special situation is detected in step 305, the routing thereto is blocked in step 306 and a new routing instruction is requested in step 307. The service control point gives a new routing instruction according to service logic. If a voice list service is involved, the routing instruction may be either an instruction requested from the caller, i.e. subscriber A or the next number in the call list. A routing instruction B2 is received at the service switching point in step 308. Next, it is checked if the routing instruction B2 is the same as the routing instruction B1 in step 308. Generally, if a Connect operation is received in step 308, a different number is involved, and if a Continue operation is received in step 308, the routing proceeds according to the routing instruction received in step 301. If it is detected that the routing instruction is the same in step 309, then the call is released, since the routing thereto was blocked in step 306. If a different number is involved, the routine proceeds from step 309 to step 310 to route the call, and the routine proceeds therefrom by setting up a connection in step 311. In other embodiments, the routine may return from step 309 to step 304, if the numbers in the routing instructions differ from each other.

If it is detected that the voice mailbox number is not involved in step 304 or if it is detected that the call list service is not involved in step 303, the routine proceeds to step 310 to route the call and continues therefrom by setting up a connection in step 311.

In a preferred embodiment, it is checked if the call list service is involved after step 308. If so, the routine proceeds to step 309 and continues therefrom. Correspondingly, if the call list service is not involved, the routine proceeds directly to step 310 and continues therefrom. In this embodiment, the control point may announce that the special situation is no longer checked either in a separate operation or in an operation comprising the routing instruction B2; in other words, the SCP can change the service type to 'not a call list' and, therefore, allow routing of any kind. An advantage of this is that the SCP is able to change the detection instruction of a special situation by, e.g., accepting the routing of the last number of the call list while going through the call list.

Steps 210 to 216 of the embodiment presented in FIG. 2 could also be included in the embodiment presented in FIG. 3.

The flow diagrams presented above in FIGS. 2 and 3 illustrate the invention. The principles described therein can also be used in services other than the call list services. The first routing instruction may be received from the caller, i.e., subscriber A, and include a number given by the caller. The checks that are performed in FIGS. 2 and 3 and their locations in the flow diagram naturally depend on how the special situations have been defined and with which special situations the checks are associated. The service can also be announced indirectly by arming a detection point for a special situation in a RequestReportBSCMEvent operation, for instance, the encounter of which leads to a similar result. Although not illustrated in the figures, a call release command could also be received as a new routing instruction. Upon requesting the instruction, call control is transferred to the service control point and, correspondingly, reception of the routing instruction transfers call control back to the service point in both FIGS. 2 and 3.

Although not illustrated in FIGS. 2 and 3, a call release command stored at the service switching point or a new routing instruction to which a call is always routed upon the detection of a special situation of a service could also serve as an instruction for a special situation. Such a routing instruction could be 'route to a maintenance centre' or 'route to a voice mailbox in a normal way'. In such instructions, there is no need to transfer call control to the service control point; therefore call control is maintained at the switching point all the time.

FIG. 4 illustrates a service switching point SSP and its functions essential to the invention. The SSP can be implemented in conventional exchanges, provided that the exchange is able to separate basic call control from service control. The service switching point SSP includes an exchange terminal SSP-ET for receiving signaling from, and transmitting signaling to, other network nodes, and an application part SSP-AP that controls the exchange terminal. The application part SSP-AP includes the actual functions of an exchange, i.e., the service switching function SSF and the call control function CCF (potentially together with the CCAF depending on the type of exchange). These functions are described in more detail in connection with FIG. 1.

The application part SSP-AP includes a call-specific, basic call state model (BCSM) which is described above in the general description, and finite state model instances (SSF-FSM). When an intelligent network service is required, the call is provided with the SSF-FSM for a SCP connection, the SSFFSM transmitting call handling instructions between the BCSM and the SCP. Upon completion of provisioning the intelligent network service, the SSF-FSM is terminated. The same basic call state model BCSM may require a new intelligent network service at some other call set-up phase. In that case, the BCSM is provided with a new finite state model instance SSF-FSM. The finite state model instances SSF-FSMs associated with the calls may occur concurrently and asynchronously.

The application part SSP-AP includes a service switching management entity (SSME) for executing the operations received from the intelligent network service control point, responding to the operations and requesting instructions. The service switching management entity SSME includes an SSME control (SSME-C) for maintaining a dialogue on behalf of the finite state model instances SSF-FSMs between other parts of the switching point and other network nodes and functions of the intelligent network, e.g., the service control point. The service switching management entity SSME is responsible for creating, activating and maintaining the finite state model instances SSF-FSMs. The SSME-C directs the received operation to the correct instance and creates the instance, if necessary.

In the first and second preferred embodiments of the invention, the application part SSP-AP includes a memory M for storing a service, a definition for a special situation and an instruction associated with the service. In addition, in the first preferred embodiment of the invention, special characters are stored in the memory, the reception of which leads to the detection of a special situation. The application part SSP-AP of the switching point is responsible for the all of the tasks or some of the tasks described in connection with FIGS. 2 and 3, depending on the embodiment.

FIG. 5 illustrates a service control point SCP and its functions essential to the invention. The SCP includes at least a terminal part SCP-ET for receiving signaling from, and transmitting signaling to, other network nodes, and an application part SCP-AP, which controls the terminal part.

The application part SCP-AP includes at least one service logic program SLP (which is used for producing intelligent network services and for which a special situation exists) and a service control function SCF (which is described in connection with FIG. 1). In addition, the application part SCPAP includes call state model instances (SCF SCSM). Specifically, each service request in the intelligent network creates a call state model instance SCSM according to the service logic program SLP. On behalf of the service logic program SLP, the SCSM maintains a dialogue with the SSF, regarding the particular call service that created the call state model instance SCSM. The call state model instances SCSMs associated with the call may occur concurrently and asynchronously. In addition, the application part SCP-AP includes a service control management entity (SCME) with a SCME control (SCME-C) for transmitting operations to the service switching point. The SCME-C is responsible for maintaining, in a centralized manner, dialogue between all call state model instances SCSMs associated with intelligent network services and other parts of the control point and other network nodes in the intelligent network, e.g., the service switching point SSP and the service data function SDF. The SCME-C is responsible for creating, activating and maintaining the call state model instances SCSMs.

In the embodiments of the invention, the application part SCP-AP includes a software routine (not shown in the figure) which ensures that the SCSM is able to recognize the operation indicating a special situation, operate according to service logic and the special situation and give new routing instructions (which can also be release instructions). In some embodiments, such as the first and the second embodiments, the software routine also ensures that the SCSM includes (in the operation information) an indication that the service is a service for which a special situation has been defined. In embodiments in which the service logic expects that the checking of the special situation is finished before the checking of the next routing instruction starts, the software routine ensures that information on this is added either to an operation or is transmitted as a specific operation.

FIG. 6 illustrates an exemplary signaling performed in accordance with the invention. As illustrated in FIG. 6, the SCP contains definitions (6-1) for a call list service, the definitions including two special situation definitions with instructions. The first special situation relates to a voice mail box (VMB); the corresponding instruction I-1 is to request a new routing instruction. The second special situation relates to a special character #; the corresponding instruction I-2 is to release the connection and to request new routing information from the SCP.

Assuming that a caller wants to call subscriber B and dials his number, the SSP would then receive a call set-up request in message 6-2. At 6-3, the SSP would detect that the call set-up request relates to an intelligent network service IN. Therefore, the SSP sends message 64 to the SCP requesting a routing instruction. The SCP then recognizes that the call list service is involved and sends, in message 6-5, a connect operation including the above mentioned special situation definitions with corresponding instructions to the SSP and a first routing instruction B1.

From the content of message 6-5, the SSP detects, at 6-6, that the call relates to a network service for which at least one special situation has been defined. The SSP then stores, at 6-6, the special situation definitions with their instructions and checks whether the number included in the routing instruction B1 is a number of a voice mail box. In this example, the number is a number of a voice mail box in the same network; therefore, the SSP detects, at 6-7, a special situation and continues according to the instructions relating to that special situation, i.e., instruction I-1.

According to the instruction I-1, the SSP requests new routing instructions from the SCP in message 6-8. The SCP then sends a new routing instruction B2 to the SSP in message 6-9. In response to receiving message 6-9, the SSP checks again, at 6-10, whether the number included in the routing instruction B2 is a number of a voice mail box. In this example, illustrated in FIG. 6, the SSP determines that the routing instruction B2 does not include such a number. Thus, the SSP then checks, at 6-10, whether the routing instruction B2 contains the special character #.

In this example, the routing instruction B2 does not contain the special character. Therefore, the SSP routes the call according to routing instruction B2 to a CB2 in message 6-11. In this example, the CB2 is a voice mail box located in another network. Therefore the SSP fails to recognize that routing instruction B2 contains a number of a voice mail box. When the call is routed to the CB2, the CB2 plays a voice message 6-12 to the caller. However, the caller is not satisfied and dials, at 6-13, the special character # which is transmitted to the SSP in message 6-14.

In response to receiving the special character #, the SSP detects, at 6-15, the special situation and proceeds to operate in accordance with the instruction I-2; according to instruction I-2, the SSP releases the connection to the CB2 and requests new routing instructions from the SCP in message 6-16. The SCP then sends new routing instruction B3 to the SSP in message 6-17. In response to receiving message 6-17, the SSP checks again, at 6-18, whether the number included in the routing instruction B3 is a number of a voice mail box. In this example, illustrated in FIG. 6, the SSP finds out that the routing instruction B3 does not include such a number. Subsequently, the SSP checks, at 6-18, whether the routing instruction B3 contains the special character #. In this example, the routing instruction B3 does not contain the special character. Therefore, the SSP then routes the call according to routing instruction B3 to a CB3 in message 6-19. In this example, the subscriber B answers and a call is established between the subscriber B and the caller.

FIG. 7 illustrates another exemplary signaling according to the invention. As illustrated in FIG. 7, the SCP contains definitions (7-1) to a call list service, the definitions including one special situation definition with instructions. That special situation relates to a special character # and the corresponding instruction II-1 is to release the connection and to request a new routing information.

Supposing that a caller wants to call subscriber B and dials his number (as illustrated in FIG. 7), the SSP receives the call set-up request in message 7-2 and detects, at 7-3, that the call set-up request relates to an intelligent network service IN. Therefore, the SSP sends message 7-4 requesting routing instruction to the SCP.

The SCP recognizes that the call list service is involved and sends, in message 7-5, a connect operation (including the special situation definition with instructions to the SSP) and a routing instruction to route according to the routing instruction given by the caller.

The then SSP detects, at 7-6, from the content of message 7-5, that the call relates to a network service for which at least one special situation has been defined; subsequently, the SSP stores, at 7-6, the special situation definition with its instructions and routes the call in message 7-7 to a CB1 according to the routing instruction given in message 7-2 by the caller.

In this example, when the call is routed to the CB1, a voice mail box answers and plays a voice message 7-8 to the caller. However, the caller is not satisfied and dials, at 7-9, the special character #, which is transmitted to the SSP in message 7-10. In response to receiving the special character#, the SSP detects, at 7-11, the special situation and continues according to the instruction II-1 (the SSP releases the connection to the CB2 and requests new routing instructions from the SCP in message 7-12). The SCP then sends a new routing instruction to the SSP in message 7-13. In response to receiving message 7-13, the SSP routes, in message 7-14, the call to a CB3 according to routing instruction in message 7-13. In this example, the subscriber B answers and a call is established between the subscriber B and the caller.

It is to be understood that the above description and the related figures are only intended to illustrate the present invention. It will be apparent to those skilled in the art that many variations and modifications can be made to the invention without departing from the scope and spirit of the invention disclosed in the attached claims.

What is claimed is:

1. A method of handling a special situation occurring during provisioning of a network service, the method providing call-related instructions to a service switching point of a network via a service control point of the network, the method comprising:

defining, for the network service, at least one special situation during which provisioning of the network service fails but the service switching point successfully operates, defining an instruction for said at least one special situation, receiving, at the service switching point, a message indicating the existence of the network service for which the special situation has been defined, the network service relating to a call, receiving, at the service switching points a first routing instruction, checking, in the service switching point, whether the first routing instruction indicates an occurrence of the special situation, detecting the special situation if the first routing instruction indicates the occurrence of the special situation, and following said first routing instruction in response to the detection of the special situation.

2. The method of claim 1, wherein said first routing instruction comprises:

requesting a second routing instruction in response to the detection of the special situation, and transferring call control to the service control point.

3. The method of claim 2, further comprising:

receiving from the service control point-a notification indicating that checking the special situation is no longer necessary, receiving the second routing instruction, and routing the call according to said second routing instruction.

4. A method of handling an intelligent network service, the intelligent network including a service control point and a service switching point, the method comprising:

connecting a call according to a first routing instruction, defining a special character by means of which a caller of the call that invoked the network service can indicate a special situation during which provisioning of the call for the caller fails but the service switching point successfully operates, receiving the special character at the service switching point, detecting in the service switching point the special situation in response to the special character being received, requesting a second routing instruction in response to the detection of the special situation, and transferring call control to the service control point.

5. The method of claim 4, wherein, in response to the second routing instruction, a portion of the connected call which originates from the service switching point is released, and call connection set-up is continued in accordance with the second routing instruction at the service switching point.

6. A network comprising a service switching point for connecting the network to other telecommunications networks and a service control point for producing services in the network, wherein for a network service is defined at least one special situation during which provisioning of the network service fails but the service switching point successfully operates, an instruction has been defined for said at least one special situation, and the service switching point is arranged to detect the special situation and follow said instruction in response to the special situation.

7. The network of claim 6, wherein the service control point is arranged to notify the service switching point that the special situation has been defined for the network service.

8. The network of claim 6, wherein the service switching point is arranged to detect the special situation in response to a character received from the terminal of a caller of a call that invoked the network service and to transfer call control to the service control point in response to the special situation.

9. The network of claim 6, wherein the service control point is arranged to notify the service switching point that the special situation of the network service is no longer monitored, and the service switching point is arranged to interpret that the network service does not have a special situation in response to said notification.

10. A service switching point of a network, comprising an interface to a service control point of the network and to a public telecommunications network, reception means for receiving instructions from the service control point, routing means for routing or releasing a call, memory means for storing at least one definition for a special situation and its instruction for at least one network service, the special situation during which provisioning of the network service fails but the service switching point successfully operates, checking means for checking if a routing instruction that is received from the service control point or a caller leads to the special situation, and function means responsive to the checking means for carrying out an operation of the routing instruction.

11. The service switching point of claim 10, wherein said routing instruction comprises call control transfer to the service control point.

12. The service switching point of claim 10, wherein said routing instruction includes call release.

13. The service switching point of claim 10, wherein said routing instruction includes a new routing instruction.

14. A service control point of a network, comprising connection means to a service switching point, management means for controlling connection set-up of a call which uses a network service, transmission means for transmitting instructions and dial information requests to the service switching point, at least a definition for the network service, the definition defining at least one special situation during which provisioning of the network service fails but connection set-up is successful, and reception means for receiving a situation message indicating the special situation, wherein the management means are arranged to give new connection set-up instructions in response to the situation message.

15. The service control point of claim 14, wherein the management means are arranged to indicate to the service switching point that a network service for which at least one special situation has been defined is associated with the call.

16. The service control point of claim 14, wherein the special situation relates to a connection already set up, and in response to the special situation, the management means are further arranged to give a release instruction to a portion of the set-up connection that originates from the service switching point.

* * * * *